US011181663B2

(12) United States Patent
Maerten et al.

(10) Patent No.: US 11,181,663 B2
(45) Date of Patent: Nov. 23, 2021

(54) DETERMINING RUPTURE ENVELOPES OF A FAULT SYSTEM

(71) Applicant: SCHLUMBERGER TECHNOLOGY CORPORATION, Sugar Land, TX (US)

(72) Inventors: Frantz Maerten, Pignan (FR); Laurent Maerten, Montferrier sur Lez (FR); Jean Pierre Joonnekindt, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 581 days.

(21) Appl. No.: 16/082,538

(22) PCT Filed: Feb. 9, 2017

(86) PCT No.: PCT/US2017/017082
§ 371 (c)(1),
(2) Date: Sep. 6, 2018

(87) PCT Pub. No.: WO2017/155655
PCT Pub. Date: Sep. 14, 2017

(65) Prior Publication Data
US 2019/0094413 A1    Mar. 28, 2019

(30) Foreign Application Priority Data
Mar. 11, 2016    (FR) ..................................... 1652041

(51) Int. Cl.
*G01V 99/00*    (2009.01)

(52) U.S. Cl.
CPC ...... *G01V 99/005* (2013.01); *G01V 2210/642* (2013.01); *G01V 2210/66* (2013.01)

(58) Field of Classification Search
CPC ........... G01V 99/005; G01V 2210/642; G01V 2210/66
See application file for complete search history.

(56) References Cited

U.S. PATENT DOCUMENTS

| | | |
|---|---|---|
| 2002/0091502 A1 | 7/2002 | Malthe-Sorenssen et al. |
| 2006/0253759 A1* | 11/2006 | Wei .................. G01V 1/282 714/738 |

(Continued)

FOREIGN PATENT DOCUMENTS

FR    3023641 A1    1/2016

OTHER PUBLICATIONS

Maerten, F. "Geomechanics to solve geological structure issues: forward, inverse and restoration modeling" [Thesis] Universite Montpellier II Sciences Et Techniques Du Languedoc. Retrieved on Mar. 17, 2021. (Year: 2010).*
Maerten, "Geomechanics to solve geological structure issues: forward, inverse and restoration modeling," PhD thesis, University of Montopellier Geosciences, France, 2010 (Front-p. 145).
Maerten, "Geomechanics to solve geological structure issues: forward, inverse and restoration modeling," PhD thesis, University of Montopellier Geosciences, France, 2010 (pp. 146-248).

(Continued)

*Primary Examiner* — Rehana Perveen
*Assistant Examiner* — Alfred H B Wechselberger
(74) *Attorney, Agent, or Firm* — Michael Guthrie

(57) ABSTRACT

Provided are a method, computer-readable medium, and a system for determining rupture envelopes for a fault system. The method includes obtaining a representation that depicts one or more faults in a region of the earth as triangulated surfaces; selecting variables from among parameters comprising stress ratio, orientation of far field stress maximum principal stress, intermediate principal stress, minimum principal stress for the far field stress, and sliding friction and cohesion of the fault system; determining a strain energy of a triangular element based on a friction coefficient, a normal stress on the triangular element, and a cohesion for the variables; summing the strain energy of each triangle in the triangulated surfaces to yield an effective shear strain (Continued)

energy; extracting one or more iso-surfaces of the effective shear strain energy based on the summing; and creating rupture envelopes for specific values of the effective shear strain energy.

20 Claims, 13 Drawing Sheets

(56) References Cited

U.S. PATENT DOCUMENTS

| | | |
|---|---|---|
| 2010/0076738 A1 | 3/2010 | Dean et al. |
| 2013/0090902 A1 | 4/2013 | Yao et al. |
| 2013/0297269 A1* | 11/2013 | Davies .................. G06F 30/20 703/6 |
| 2013/0311158 A1 | 11/2013 | Dasarl |
| 2016/0011333 A1 | 1/2016 | Maerten et al. |
| 2016/0018542 A1 | 1/2016 | Maerten et al. |

OTHER PUBLICATIONS

Maerten, "Geomechanics to solve geological structure issues: forward, inverse and restoration modeling," PhD thesis, University of Montopellier Geosciences, France, 2010 (pp. 249-455).

Wiebols, et al., "An energy criterion for the strength of rock in polyaxial compression," International Journal of Rock Mechanics and Mining Science & Geomechanics Abstracts 1968, vol. 5, Issue 6, Nov. 1968, pp. 529-549.

International Search Report and Written Opinion for the equivalent International patent application PCT/US2017/017082 dated May 17, 2017.

Saloustros, et al., "A crack-tracking technique for localized cohesive-frictional damage," Engineering Fracture Mechanics, vol. 150, Oct. 29, 2015, pp. 96-114.

Search Report for the equivalent French patent application 1652041 dated Dec. 19, 2016.

Extended Search Report for the equivalent European patent application 17763714.7 dated Sep. 12, 2019.

\* cited by examiner

Legends

$\bar{R} \in [0,3]$
  → $\bar{R} \in [0,1]$: Normal Fault Regime
  → $\bar{R} \in [0,2]$: Strike-Slip Fault Regime
  → $\bar{R} \in [2,3]$: Thrust Fault Regime
$\theta \in [0,180]$
$C_0 \in [0, \frac{1}{2}]$
$\mu \in [0,1]$ Iso-Surfaces: $W_{eff}$
Iso-Contours: $z$ Each Cube is 51 x 51 x 51 Points Oblique View Oblique View

DETERMINING RUPTURE ENVELOPES OF A FAULT SYSTEM

BACKGROUND

A fault may be considered a finite complex three-dimensional surface discontinuity in a volume of earth or rock. Fractures, including, without limitation, joints, veins, dikes, pressure solution seams with stylolites, and so forth, may be propagated intentionally, to increase permeability in formations such as shale, in which optimizing the number, placement, and size of fractures in the formation increases the yield of resources like shale gas.

Stress, in continuum mechanics, may be considered a measure of the internal forces acting within a volume. Such stress may be defined as a measure of the average force per unit area at a surface within the volume on which internal forces act. The internal forces may be produced between the particles in the volume as a reaction to external forces applied to the volume.

Understanding the origin and evolution of faults and the tectonic history of faulted regions can be accomplished by relating fault orientation, slip direction, geologic and geodetic data to the state of stress in the earth's crust. In certain inverse problems, the directions of the remote principal stresses and a ratio of their magnitudes are constrained by analyzing field data on fault orientations and slip directions as inferred from artifacts such as striations on exposed fault surfaces. Also, even if many faults surfaces can be interpreted from seismic, for a given geological time, some of them were active (i.e., were not sealed) and therefore have slipped. Since slipping faults greatly perturbed the stress, and consequently generate associated fracturation, it may be desirable to determine, for a given geological time (past or present), which faults were active and which were sealed (i.e., inactive).

Conventionally, a numerical code, such as a finite element method or a boundary element method, is used to determine a slip/no-slip condition of a fault system, which is used for the extraction of other rupture envelopes. However, these conventional methods have had certain limitations.

SUMMARY

In accordance with examples of the present disclosure, a method, a computer-readable medium, and a system operable to execute the method for determining rupture envelopes for a fault system. The method can include obtaining a representation that depicts one or more faults in a region of the earth as triangulated surfaces; selecting variables from among parameters comprising stress ratio, orientation of far field stress maximum principal stress, intermediate principal stress, minimum principal stress for the far field stress, and sliding friction and cohesion of the fault system; determining a strain energy of a triangular element based on a friction coefficient, a normal stress on the triangular element, and a cohesion for the variables; summing the strain energy of each triangle in the triangulated surfaces to yield an effective shear strain energy; extracting one or more iso-surfaces of the effective shear strain energy based on the summing; and creating one or more rupture envelopes for specific values of the effective shear strain energy based on the extracting.

In accordance with examples of the present disclosure, the representation is a three-dimensional representation and wherein the variables comprises a triplet of variables.

In accordance with examples of the present disclosure, the method includes causing the one or more rupture envelopes to be displayed.

In accordance with examples of the present disclosure, the determining the strain energy of the triangular element comprises using a Mohr-Coulomb criterion given by the equation $\mu\sigma_n + C_0$, wherein $\mu$ is the friction coefficient, $\sigma_n$ normal stress on a triangular element, and $C_0$ is the cohesion.

In accordance with examples of the present disclosure, the method further includes determining a projection of a stress tensor on a crack plane and a projection of the stress tensor normal of the crack plane.

In accordance with examples of the present disclosure, the representation is obtained based at least in part on field data, wherein the field data includes multiple types of geologic data obtained from multiple sources, comprising one of seismic interpretation data, well bore data, or field observation data; and wherein the multiple types of geologic data comprise one of fault geometry data, fault throw data, slickenline data, displacement data for a geologic fault.

In accordance with examples of the present disclosure, the one or more iso-surfaces are extracted using a marching cube graphics algorithm.

In accordance with examples of the present disclosure, the effective shear strain energy of a value close to zero corresponds to a transition between slip and no-slip for a fault.

In accordance with examples of the present disclosure, the strain energy is based on difference between a projection of a stress tensor on a crack plane ("τ") and a Mohr-Coulomb criterion, if the τ is greater than the Mohr-Coulomb criterion.

In accordance with examples of the present disclosure, the effective shear strain energy is the sum from all triangular elements of the individual strain energy.

In accordance with examples of the present disclosure, a transition between slip and no-slip for a fault is characterized by a transition between the effective shear strain energy between zero and non-zero.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
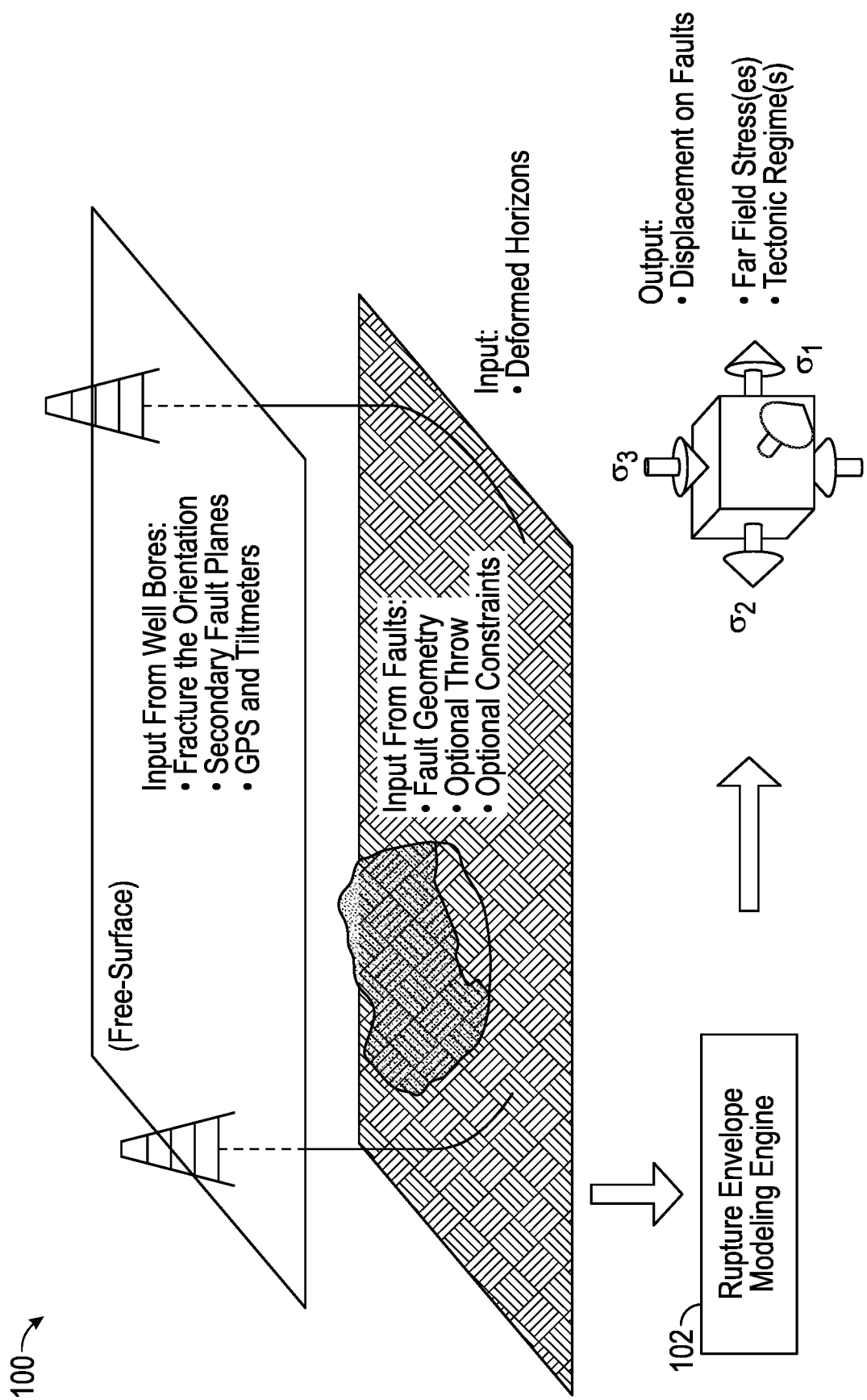
FIG. 1 is a diagram of an example stress, fracture, and fault activity modeling system.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Definitions

In the description below, certain variables are used in order to simplify the presentation. Table 1 below shows each variable that may be used and the variables' corresponding definition in accordance with examples of the present disclosure.

TABLE 1

| Parameters used to define the new criterion: | |
|---|---|
| 1. Sliding friction coefficient for the micro cracks: | µ |
| 2. Cohesion of the micro cracks: | $C_o$ |
| 3. Orientation of the far field stress: | θ |
| 4. Stress ratio defined as $(\sigma_2 \sigma_3)/(\sigma_1 \sigma_3)$ and ∈ [0, 1]: | $\overline{R}$ |
| 5. Maximum principal stress: | $\sigma_1$ |
| 6. Intermediate principal stress: | $\sigma_2$ |
| 7. Minimum principal stress: | $\sigma_3$ |

Effective shear stress (noted $\tau_{eff}$): the difference between the resolve shear stress onto the triangular element and the Mohr-Coulomb criterion: $\tau_{eff}=\tau-M_c$ if $\tau>M_c$, 0 otherwise.

Strain energy for triangular element: the effective shear stress gives rise to the strain energy: $W_e=a\cdot\tau_{eff}^2$ (a is a constant for a given material)

Effective shear strain energy: the sum of all strain energy for a surface made of multiple triangular elements.

In accordance with examples of the present disclosure, a method and associated system, and computer readable medium operate to execute the method of determining the stability of a fault system subjected to tectonic constraints and fluid pressure is provided. In particular, given a system composed of one to many triangulated faults surfaces in 3D, the stability of the fault system is determined, at least in part, on the transition between a slip and a no-slip condition given a friction law on the fault surfaces. By varying the tectonic constraint as well as the parameters of the friction law (e.g., friction and/or cohesion), rupture envelopes are built in 3D which tells when the fault system will start to slip. A rupture envelope, also called a failure envelope, is the locus of all shear and normal stresses at failure for a given rock material. A failure envelope delineates stable and unstable states of stress for a given rock material. Using the Coulomb criterion for sliding faults, as discussed below, the first rupture envelope corresponds to the effective shear strain energy equals to zero. Using the Coulomb criterion for sliding faults as discussed below, additional failure envelopes corresponding to the value of the effective shear strain energy produced by the sliding fault surfaces can be generated. The tectonic constraints are the parameters defining the far field stress (or tectonic stress) applied to the model as boundary condition. For Andersonian stress field, it is two parameters such as θ, the orientation of the principal horizontal stress according to the north, and R, the stress ratio, $R=(\sigma_2 \sigma_3)/(\sigma_1 \sigma_3)$. Rupture envelopes corresponding to the transition of slip/no-slip can be computed based on the effective shear strain energy. The effective shear strain energy can also be used to compute rupture envelopes corresponding to a specific values of the effective shear strain energy of a fault system, which can be compared to a specific geomechanical parameter of the fault system.

FIG. 1 shows an example stress, fracture, and fault activity modeling system 100. The example system 100 may be capable of solving a variety of geomechanical problems. The faults geometry may be known (and optionally, imposed inequality constraints such as normal, thrust, etc., may be known), and fault activity (active faults versus inactive faults) of certain faults may be known. The user may have access to one or more of data from well bores (e.g., fracture orientation, in-situ stress measurements, secondary fault planes), geodetic data (e.g., InSAR, GPS, and tilt-meter), and/or as interpreted horizons. An example rupture envelope modeling engine 102 and/or corresponding example methods can determine one or more rupture envelopes (or yield surfaces) corresponding to a specific values of the effective shear strain energy of a fault system.

Figure 2:
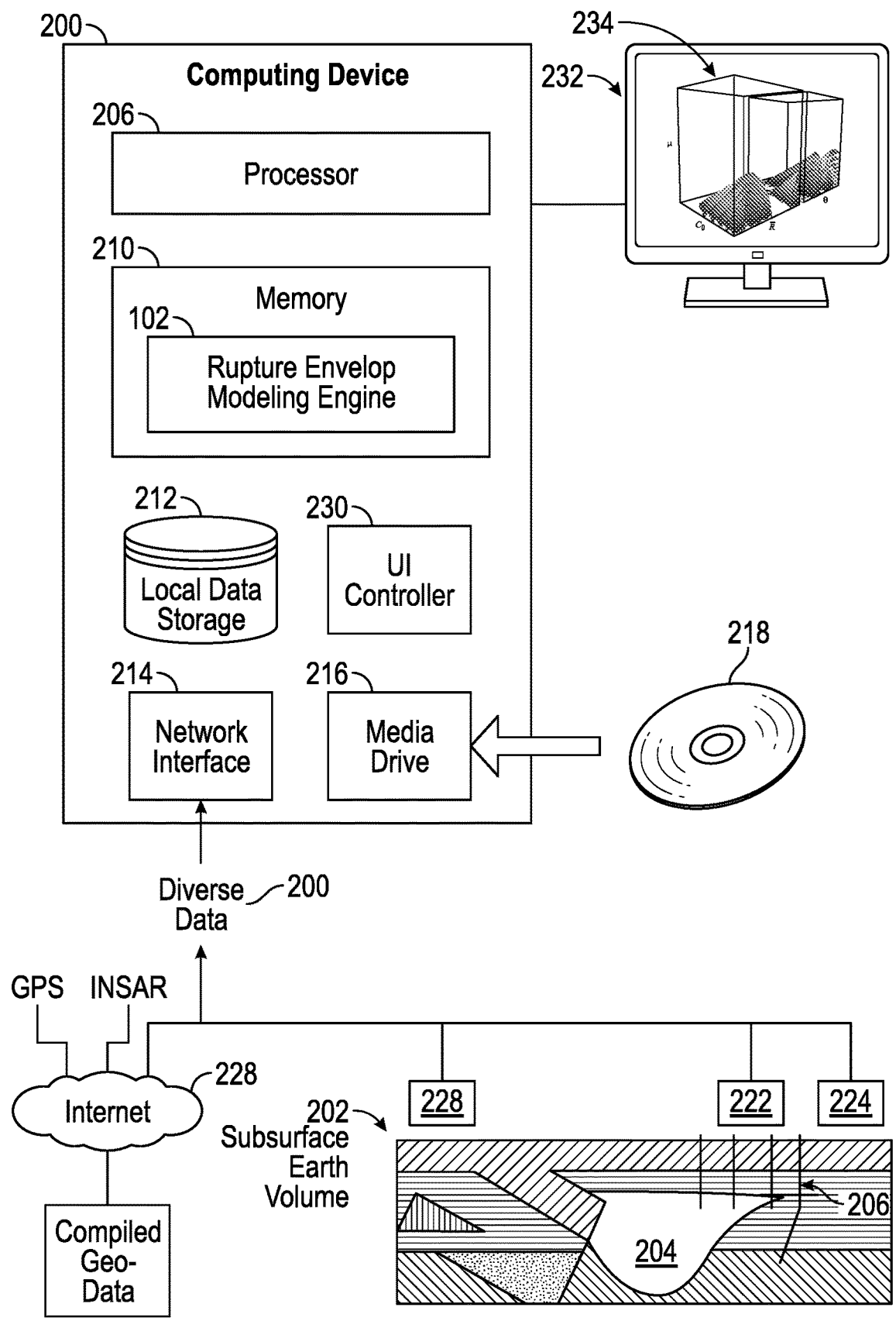
FIG. 2 is a block diagram of an example computing environment for performing stress, fracture, and fault activity modeling using the principle of superposition.

FIG. 2 shows the example system 100 of FIG. 1 in the context of a computing environment in which rupture envelopes of a fault system can be performed. The computing device 200 may be a computer, computer network, or other device that has a processor 208, memory 210, data storage 212, and other associated hardware such as a network interface 214 and a media drive 216 for reading and writing a removable storage medium 218. The removable storage medium 218 may be, for example, a compact disc (CD); digital versatile disk/digital video disc (DVD); flash drive, etc. The removable storage medium 218 contains instructions, which when executed by the computing device 200, cause the computing device 200 to perform one or more example methods described herein. Thus, the removable storage medium 218 may include instructions for implementing and executing the example rupture envelopes using engine 102 and/or graphical display etc. Specifically, software instructions or computer readable program code to perform embodiments may be stored, temporarily or permanently, in whole or in part, on a non-transitory computer readable medium such as a CD, a DVD, a local or remote storage device, local or remote memory, a diskette, or any other computer readable storage device.

In this example system, the computing device 200 receives incoming data 220, such as faults geometry and many other kinds of data, from multiple sources, such as well bore measurements 222, field observation 224, and seismic interpretation 226 from, for example, a subsurface earth volume 202, reservoir 204, and associated wells 206. The computing device 200 can receive one or more types of data sets 220 via the network interface 214, which may also receive data from a network (e.g., the Internet 228), such as GPS data and InSAR data. The computing device 200 may compute (or calculate) and compile modeling results, simulator results, and control results, and a display controller 230 may output geological model images and simulation images and data to a display 232. The images may be 2D or 3D representations 234 of the one or more rupture envelopes generated by rupture envelope modeling engine 102, which may also generate one or more visual user interfaces (UIs) for input and/or display of data.

Rupture envelope modeling engine 102 may also generate or ultimately produce control signals to control field operations associated with the subsurface volume. For example, the field operations may be performed using drilling and exploration equipment, well control injectors and valves, or other control devices in real-world control of the reservoir 204, transport and delivery network, surface facility, and so forth. The one or more rupture envelopes can also be use to estimate the risk of reactivated a fault system.

Thus, an example system 100 may include a computing device 200 and interactive graphics display unit 232. The computing environment of the example system 100 as a whole may constitute simulators and models.

Figure 3:
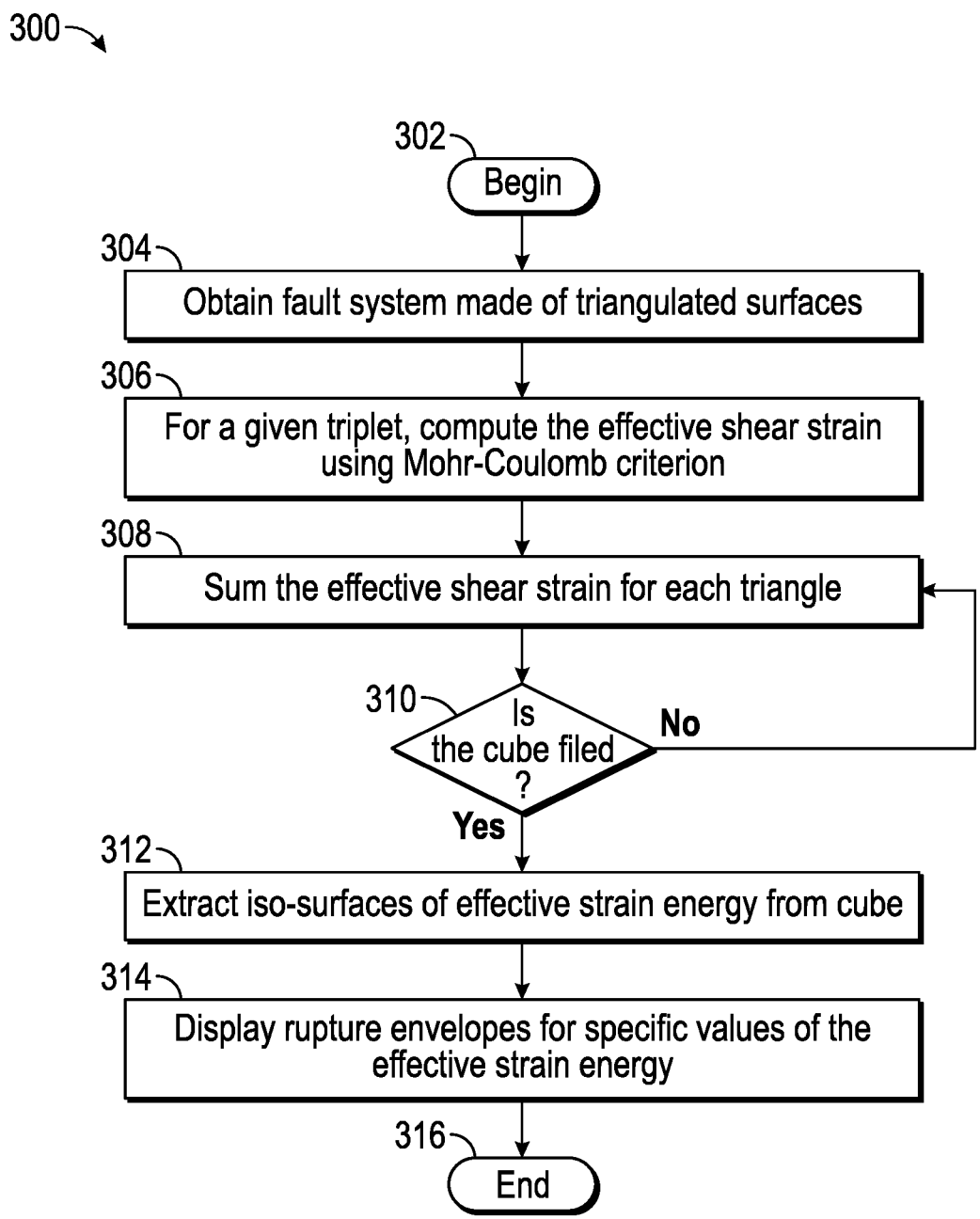
FIG. 3 is an example method for computing rupture envelopes, according to examples of the present disclosure.

FIG. 3 shows an example method for calculating rupture envelopes, according to examples of the present disclosure. The method 300 begins at 302. At 304, a representation of a fault system is obtained. As discussed above, the fault system can be stored in memory 210 and can be modeled using modeling engine 102. The fault system can be represented in 3D and can be obtained based at least in part on field data. The field data can include one or more of multiple types of geologic data obtained from multiple sources, such as diverse data 220, including one of seismic interpretation data, well bore data, or field observation data; and wherein the multiple types of geologic data comprise one of fault geometry data, fracture orientation data, stylolites orientation data, secondary fault plane data, fault throw data, slickenline data, global positioning system (GPS) data, interferometric synthetic aperture radar (InSAR) data, laser ranging data, tilt-meter data, displacement data for a geologic fault, or stress magnitude data for the geologic fault.

The fault system is segmented into a series of triangulated surfaces using, for example, computer-aided design ("CAD") software. Faults are represented by the triangulated surfaces. The advantage is that three-dimensional fault surfaces more closely approximate curvi-planar surfaces and curved tip-lines without introducing overlaps or gaps. Other known methods of producing triangulated surfaces can be used.

At 306, for a given triplet among the seven parameters shown in Table 1, the effective shear strain energy is computed using the Mohr-Coulomb criterion. In order to visualize the transition between slip and no-slip, the attribute slip/no-slip is calculated for a variety of values of (for example) friction, cohesion, orientation of the far field stress. The slip/no-slip attribute corresponds to $W_{eff=0}$ that is computed for each point of the cube. The effective shear strain energy ($W_{eff}$) is calculated, and the slip-no-slip transition corresponds to the transition $W_{eff}=0$ and $W_{eff} \neq 0$. Three variables are chosen in order to display in 3D the rupture envelopes inside a cube. In the description and figures that follow, the three variables are friction, cohesion, stress ratio for the 3 axis (first cube in figure examples), and friction, cohesion and orientation of $\sigma_H$ for the second cube. For a given fault system made of triangulated surfaces, and for a given triplet ($\mu$, $C_o$, $\overline{R}$), the effective shear stress is computed for each triangle using the Mohr-Coulomb criterion.

Figure 4:
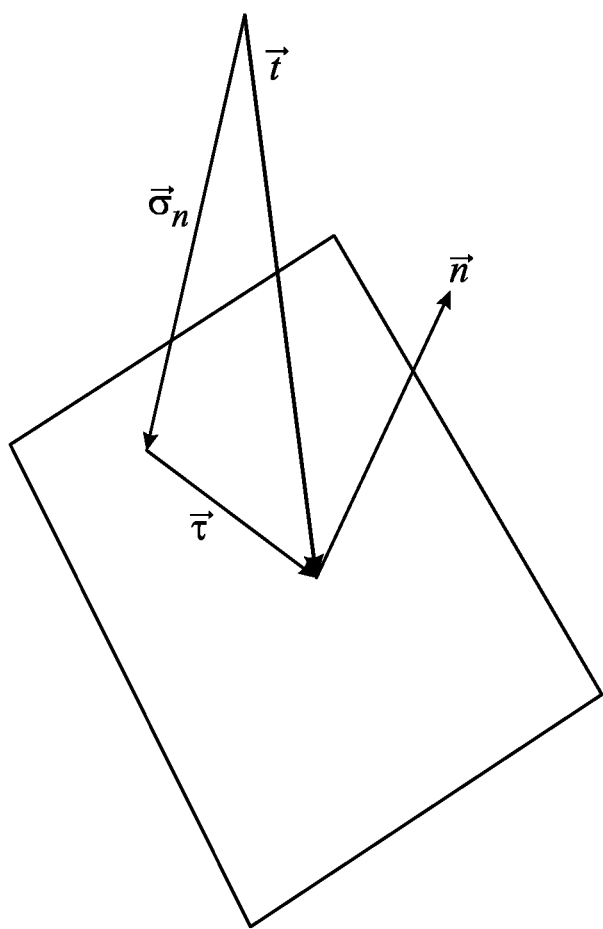
FIG. 4 shows an example representation of a plane with its normal n.

The Mohr-Coulomb criterion is given by $M_c = \mu \sigma_n + C_o$, where $\mu$ is the friction coefficient, $\sigma_n$, is the normal stress on the triangular element and $C_o$ is the cohesion. FIG. 4 shows an example representation of a plane with its normal $\overline{n}$. Here, the traction vector, which is the projection of the stress tensor onto a plane (onto a triangular element) using the Cauchy formula: $\overline{t} = \overline{\sigma} \overline{n}$ where $\overline{n}$ is the normal to the triangular element, is $\overline{t} = \overline{\sigma} \overline{n}$, where $\overline{\sigma}$ is the stress tensor. $\sigma_n$ and $\overline{\tau}$ are the projection along $\overline{n}$ and on the plane, respectively. $\sigma_n$ and $\overline{\tau}$ are given by are the projection of the stress tensor on the crack plane and the normal of the plane, respectively and is given by the Cauchy formula:

$$\begin{cases} \sigma_n = (\overline{\sigma}\overline{n}) \cdot \overline{n} \\ \overline{\tau} = \|(\overline{\sigma}\overline{n}) \; [(\overline{\sigma}\overline{n}) \cdot \overline{n}]\overline{n}\| \end{cases}$$

where "•" is the inner product, $\overline{\sigma}$ is the stress tensor and $\overline{n}$ is the normal to the triangular element. A triangular element, given by its normal n, will slip if the shear stress $\tau$ is greater or equal to $M_c$. In such case, the effective shear stress is defined as $\tau_{eff} = \tau - M_c$, and the corresponding shear strain energy for this triangular element is $W_e = a \cdot \tau_{eff}^2$, where a is a constant which depends on the material (taken equal to 1).

At 308, the sum of the strain energies is computed for all triangles, giving rise to $W_{eff} = a \Sigma \tau_{eff}^2$. This process is repeated for many values of ($\mu$, $C_o$, $\overline{R}$). At 310, a determination is made as to whether the cube is filled. If not, additional calculations are made at 306 and 308. If the cube is filled, then the method progresses to 312, where, iso-surfaces of $W_{eff}$, are extracted from the cube to display the rupture envelopes for specific values of $W_{eff}$ at 314. Each axis of the cube represents a variable and the three variables (axis) are varied by an increment, and for each value of the tuple (one point of the cube), the $W_{eff}$, is computed. This is done for the whole cube. Filling cube means that we have initially 3 variables (representing the 3 axis of a cube) that are varied from a minimum value to a maximum value with a given step. For each point of the cube (i.e., for each value of the 3 variables), $W_{eff}$, is computed and set the resulting value at that point. This is done for all points of the cube=the cube is filled=all points of the cube have a compute $W_{eff}$.

In order to have the effective shear strain energy $W_{eff}$, one must sum up $\tau_{eff}$ for all triangular element making the fault system:

$$W_{eff} = a \sum_{i=1}^{n} \tau_{eff}^{(i)}$$

where a is a constant for the given fault system and which depends also on the mechanical properties, for example, Young modulus, poisson's ratio, density, etc., of the rocks in which the fault system is embedded. From the cube, and for different values of $W_{eff}$, iso-surfaces are extracted, for example, using a marching cube as the cube is regular. As known in the art, a marching cube is an algorithm for extracting a polygonal mesh of an iso-surface from a three-dimensional discrete scalar field (sometimes called voxels). For a value of $W_{eff}$ close to zero, this corresponds to the transition slip/no-slip. For other values of $W_{eff}$, this corresponds to a specific property of a fault system, such as the fault system reactivation. The method can end at 316.

The above method can be represented by an algorithm as follows:

```
Input:
  1. Fault system as triangulated surfaces in 3D
  2. Variable for the X-axis (for example, cohesion C_o)
  3. Variable for the Y-axis (for example, stress ratio R̄, or the
     orientation of σ_H, θ)
  4. Variable for the Z-axis (for example, friction μ)
Filling the cube
  For C_o varies
    For θ varies
      For μ varies
        Let W_eff = 0
        For each triangle with normal n
          Compute τ and σ_n
          Compute M_c
          If τ ≥ M_c
            τ_eff = τ M_c
            W_eff = W_eff + τ_eff^2
          EndIf
        EndFor
        Set the value at (C_o, R̄, μ) in the cube to W_eff
      EndFor
    EndFor
  EndFor
```

Figure 5:
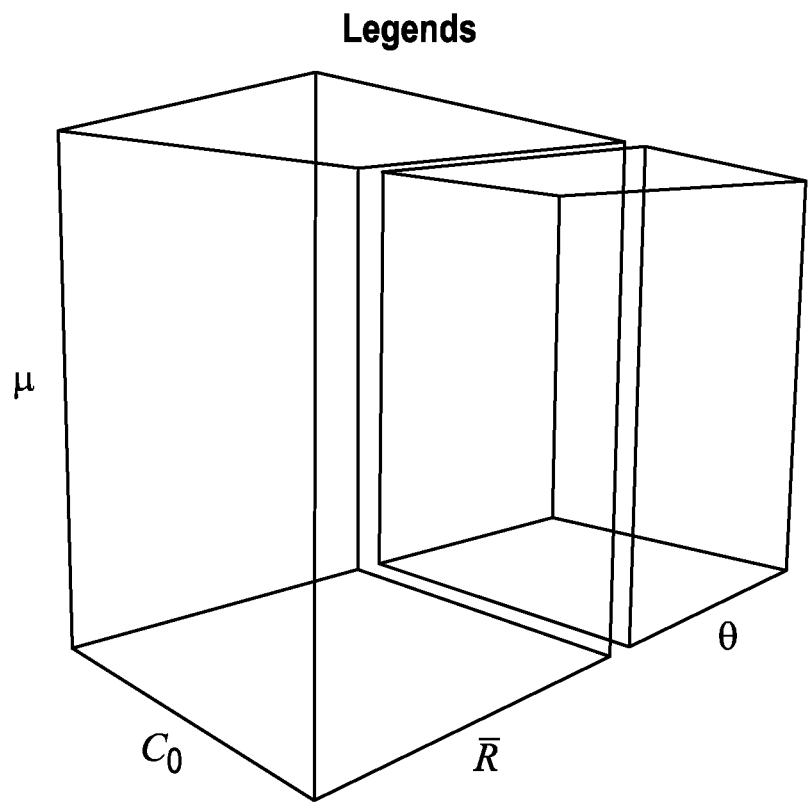
FIG. 5 shows graphical convention used for the following examples.

FIG. 5 shows graphical convention used for the examples that follow. The rupture envelopes are shown using a coordinate system with axes of the triplet ($\mu$, $C_o$, $\bar{R}$) and the triplet ($\mu$, $C_o$, $\bar{\theta}$), where $\bar{R} \in [0,3]$, $\bar{R} \in [0,1]$: Normal fault regime, $\bar{R} \in [0,2]$: Strike-slip fault regime, $\bar{R} \in [2,3]$: Thrust fault regime, $\theta \in [0,180]$, $C_0 \in [0,1/2]$, $\bar{\mu} \in [0,1]$, iso-surfaces are $W_{eff}$, and iso-contours are z. Each cube is 51×51×51 points.

Figure 6A:
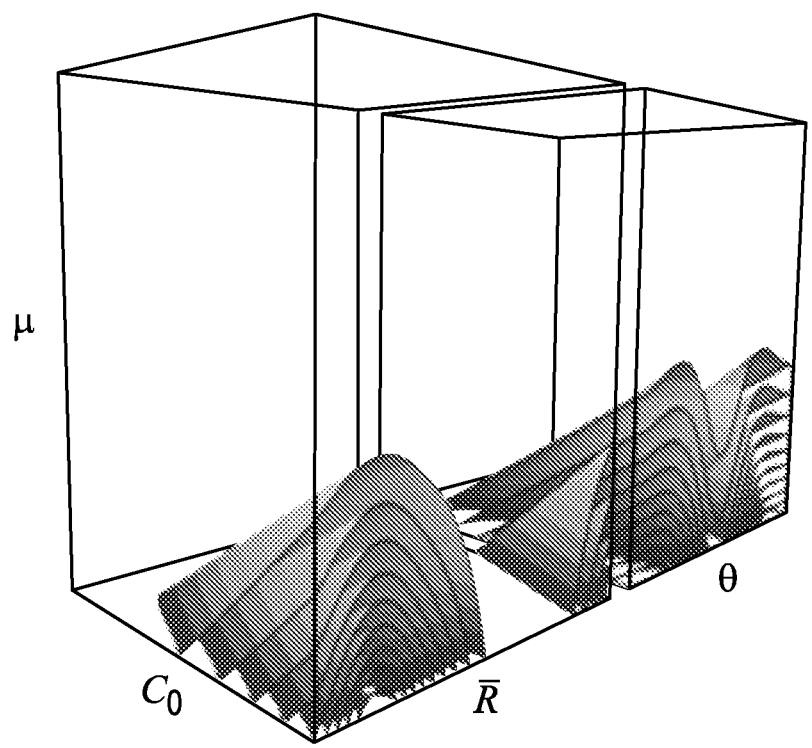
FIGS. 6A and 6B illustrate an example rupture envelope for a planar fault and associated triangulated surface, respectively, according to examples of the present disclosure.
Figure 6B:
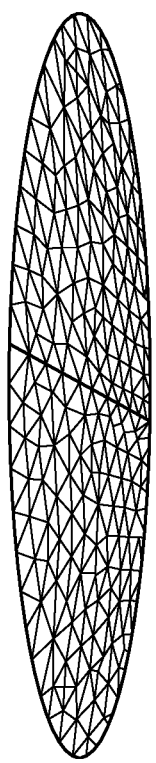
Figure 7A:
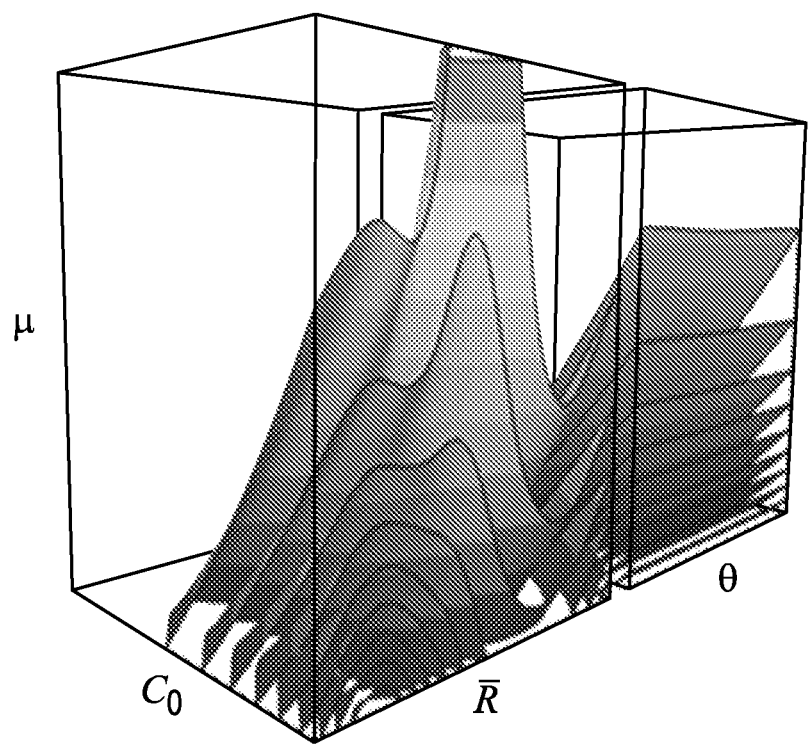
FIGS. 7A and 7B illustrate an example rupture envelope for a spherical fault and associated triangulated surface, respectively, according to examples of the present disclosure.
Figure 7B:
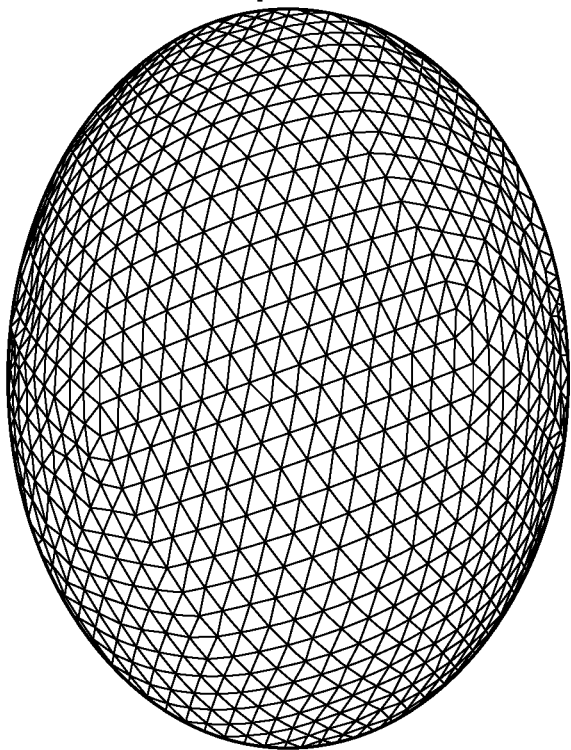
Figure 8A:
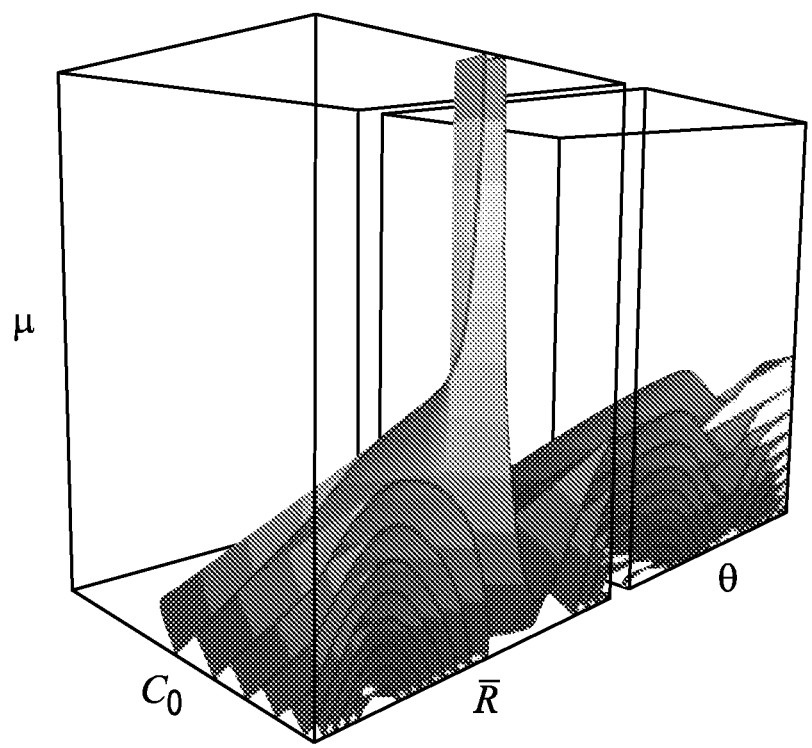
FIGS. 8A and 8B illustrate an example rupture envelope for two branching faults at 30° and associated triangulated surface, respectively, according to examples of the present disclosure.
Figure 8B:
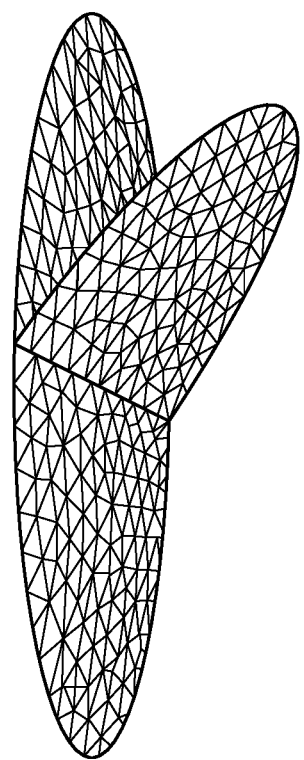
Figure 9A:
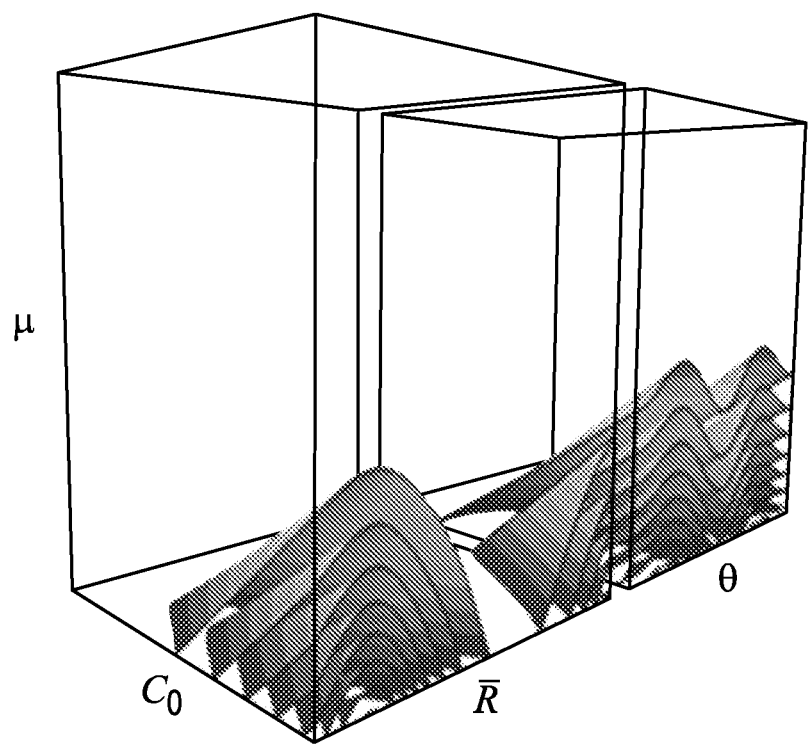
FIGS. 9A and 9B illustrate an example rupture envelope for two branching faults at 90° and associated triangulated surface, respectively, according to examples of the present disclosure.
Figure 9B:
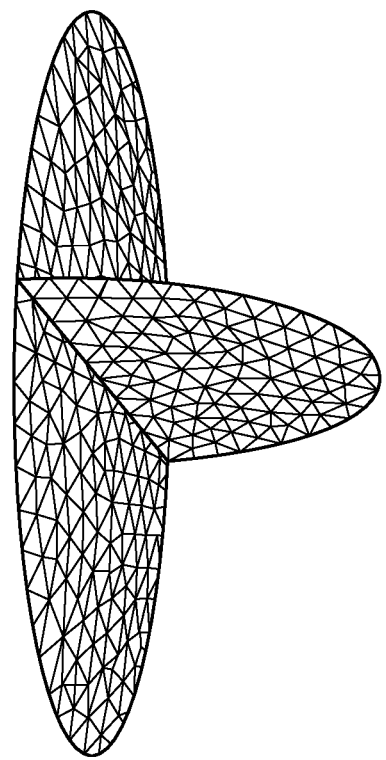
Figure 10A:
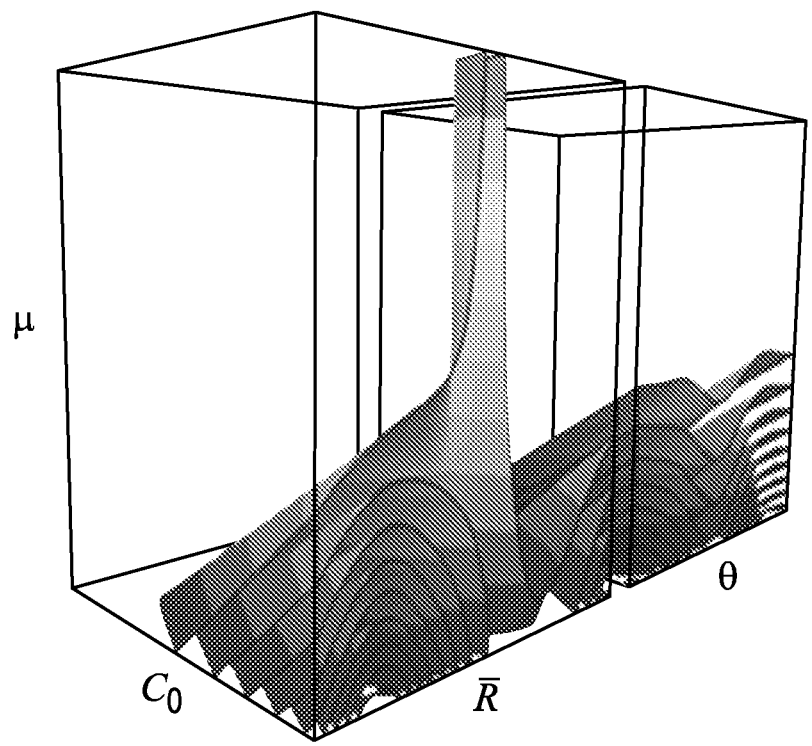
FIGS. 10A and 10B illustrate an example rupture envelope for two branching faults at 120° and associated triangulated surface, respectively, according to examples of the present disclosure.
Figure 10B:
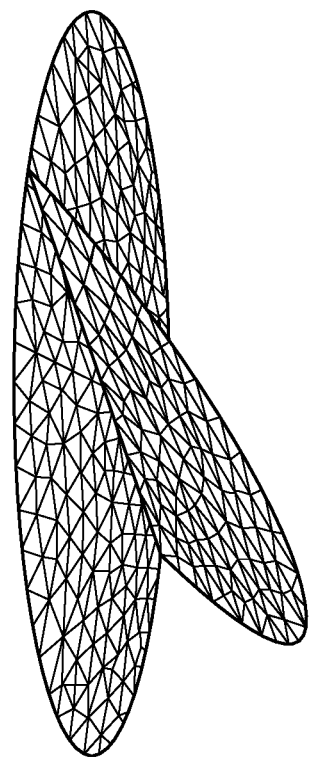
Figure 11A:
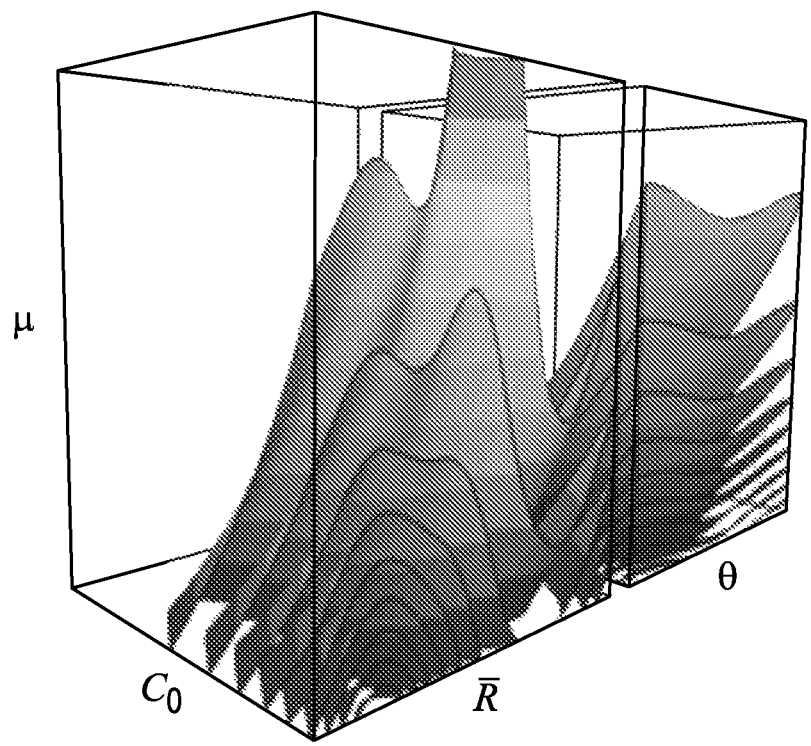
FIGS. 11A and 11B illustrate an example rupture envelope for salt domes and associated triangulated surface, respectively, according to examples of the present disclosure.
Figure 11B:
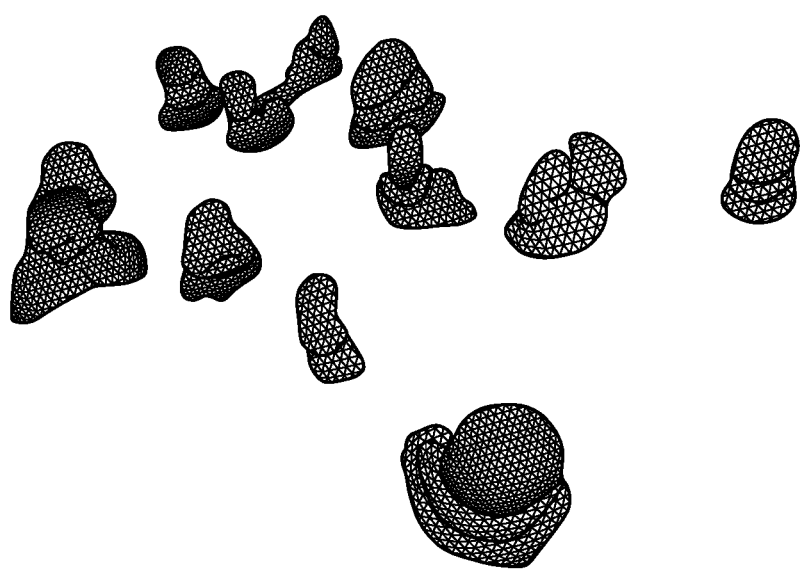
Figure 12A:
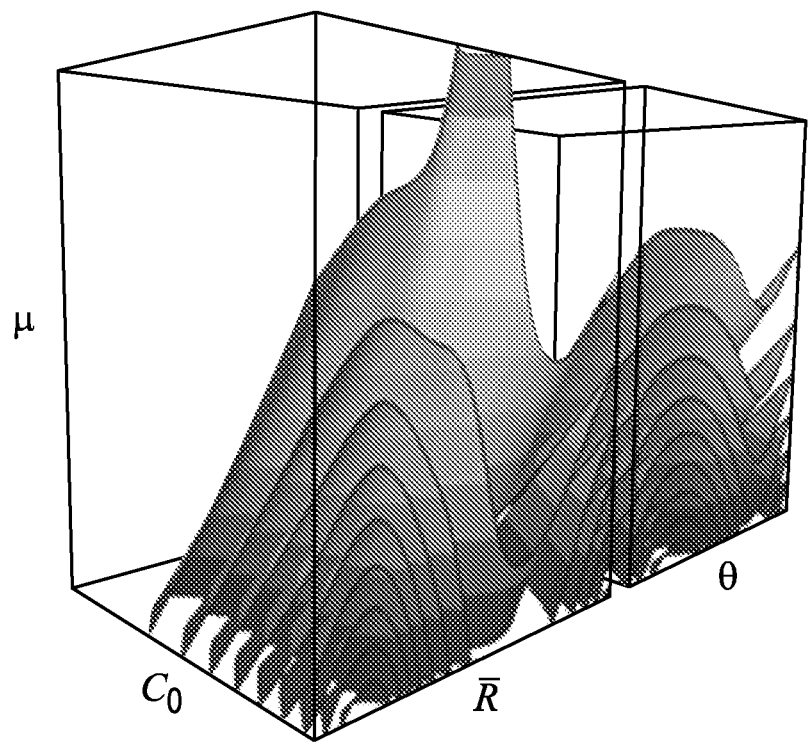
FIGS. 12A and 12B illustrate an example rupture envelope for a complex fault system and associated triangulated surface, respectively, according to examples of the present disclosure.
Figure 12B:
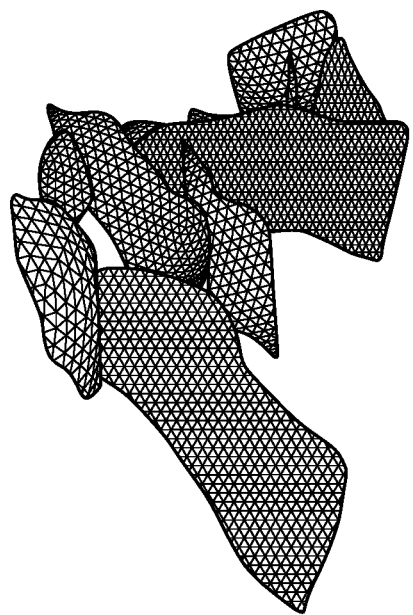
Figure 13A:
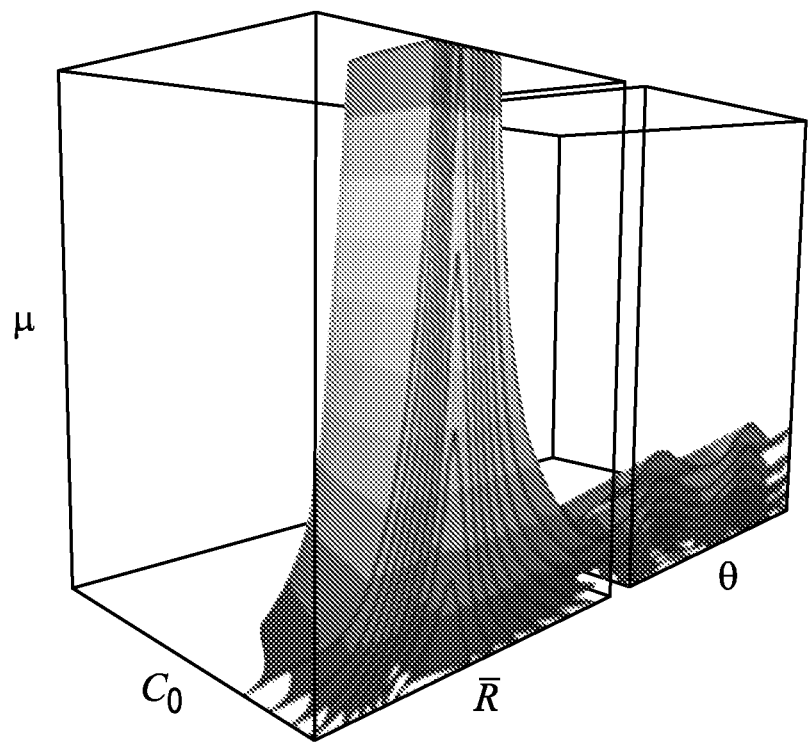
FIGS. 13A and 13B illustrate an example rupture envelope for another complex fault system and associated triangulated surface, respectively, according to examples of the present disclosure.
Figure 13B:
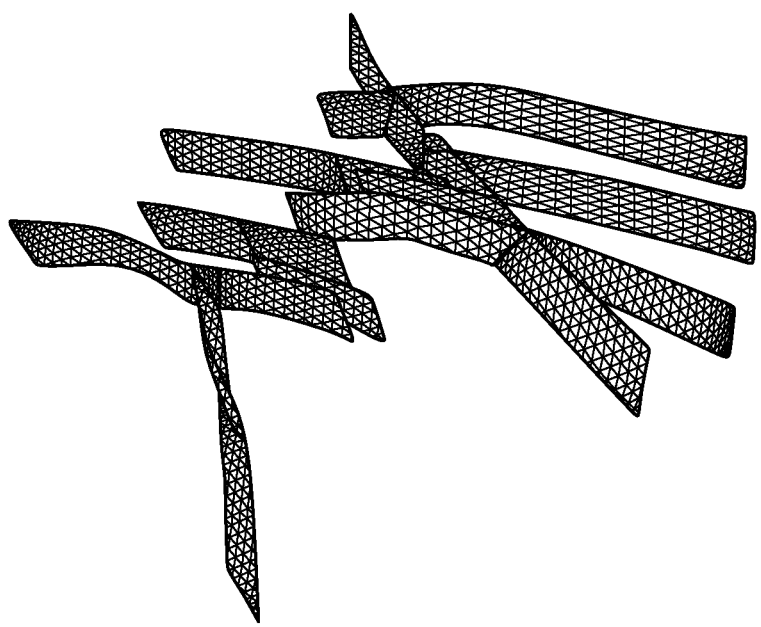

FIGS. 6A and 6B illustrate an example rupture envelope for a planar fault and associated triangulated surface, respectively. FIGS. 7A and 7B illustrate an example rupture envelope for a spherical fault and associated triangulated surface, respectively. FIGS. 8A and 8B illustrate an example rupture envelope for two branching faults at 30° and associated triangulated surface, respectively. FIGS. 9A and 9B illustrate an example rupture envelope for two branching faults at 90° and associated triangulated surface, respectively. FIGS. 10A and 10B illustrate an example rupture envelope for two branching faults at 120° and associated triangulated surface, respectively. FIGS. 11A and 11B illustrate an example rupture envelope for salt domes and associated triangulated surface, respectively. FIGS. 12A and 12B illustrate an example rupture envelope for a complex fault system and associated triangulated surface, respectively. FIGS. 13A and 13B illustrate an example rupture envelope for another complex fault system and associated triangulated surface, respectively.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A method comprising;
  obtaining a representation based at least in part on field data that depicts one or more faults in a region of the earth as triangulated surfaces that comprise triangular elements;
  selecting variables from among parameters comprising stress ratio, orientation of far field stress, maximum principal stress, intermediate principal stress, minimum principal stress for the far field stress, and sliding friction and cohesion of a fault system;
  determining a strain energy of each of the triangular elements based on a friction coefficient, a triangular element normal stress, and a cohesion for the variables;
  summing the strain energy of each of the triangular elements in the triangulated surfaces to yield an effective shear strain energy;
  extracting one or more iso-surfaces of the effective shear strain energy based on the summing; and
  generating, based on the extracting, one or more rupture envelope images, wherein the effective shear strain energy of a value of zero corresponds to a transition between slip and no-slip for a fault.

2. The method of claim 1, wherein the representation is a three-dimensional representation and wherein the variables comprises a triplet of variables.

3. The method of claim 1, wherein determining the strain energy of the triangular element comprises using a Mohr-Coulomb criterion given by the equation $-\mu\sigma_n+C_0$, wherein $\mu$ is the friction coefficient, $\sigma_n$ normal stress on a triangular element, and $C_0$ is the cohesion.

4. The method of claim 1, wherein the strain energy is based on difference between a projection of a stress tensor on a crack plane and a Mohr-Coulomb criterion, if the projection of the stress tensor on the crack plane is greater than the Mohr-Coulomb criterion.

5. The method of claim 1, wherein the effective shear strain energy is the sum from all triangular elements of the individual strain energy.

6. The method of claim 1, wherein a transition between slip and no-slip for a fault is characterized by a transition between the effective shear strain energy between zero and non-zero.

7. The method of claim 1, comprising generating one or more visual user interfaces that comprises at least one of the one or more rupture envelope images and a fault representation of at least one of the one or more faults in the region of the earth.

8. A computing system comprising:
  one or more processors; and
  a memory system comprising one or more non-transitory computer-readable media storing instructions that, when executed by at least one of the one or more processors, cause the computing system to perform operations, the operations comprising:

obtaining a representation based at least in part on field data that depicts one or more faults in a region of the earth as triangulated surfaces that comprise triangular elements;

selecting variables from among parameters comprising stress ratio, orientation of far field stress, maximum principal stress, intermediate principal stress, minimum principal stress for the far field stress, and sliding friction and cohesion of a fault system;

determining a strain energy of each of the triangular elements based on a friction coefficient, a triangular element normal stress, and a cohesion for the variables;

summing the strain energy of each of the triangular elements in the triangulated surfaces to yield an effective shear strain energy;

extracting one or more iso-surfaces of the effective shear strain energy based on the summing; and generating, based on the extracting, one or more rupture envelope images, wherein the effective shear strain energy of a value of zero corresponds to a transition between slip and no-slip for a fault.

9. The computing system of claim 8, wherein the representation is a three-dimensional representation and wherein the variables comprises a triplet of variables.

10. The computing system of claim 8, wherein determining the strain energy of the triangular element comprises using a Mohr-Coulomb criterion given by the equation $-\mu\sigma_n+C_0$, wherein $\mu$ the friction coefficient, $\sigma_n$ normal stress on a triangular element, and $C_0$ is the cohesion.

11. The computing system of claim 8, wherein the strain energy is based on difference between a projection of a stress tensor on a crack plane and a Mohr-Coulomb criterion, if the projection of the stress tensor on the crack plane is greater than the Mohr-Coulomb criterion.

12. The computing system of claim 8, wherein a transition between slip and no-slip for a fault is characterized by a transition between the effective shear strain energy between zero and non-zero.

13. The computing system of claim 8, wherein the effective shear strain energy is the sum from all triangular elements of the individual strain energy.

14. The computing system of claim 8, comprising generating one or more visual user interfaces that comprises at least one of the one or more rupture envelope images and a fault representation of at least one of the one or more faults in the region of the earth.

15. A non-transitory computer-readable medium storing instructions that, when executed by at least one processor of a computing system, cause the computing system to:

obtain a representation based at least in part on field data that depicts one or more faults in a region of the earth as triangulated surfaces that comprise triangular elements;

select variables from among parameters comprising stress ratio, orientation of far field stress, maximum principal stress, intermediate principal stress, minimum principal stress for the far field stress, and sliding friction and cohesion of a fault system;

determine a strain energy of each of the triangular elements based on a friction coefficient, a triangular element normal stress, and a cohesion for the variables;

sum the strain energy of each of the triangular elements in the triangulated surfaces to yield an effective shear strain energy;

perform an extraction of one or more iso-surfaces of the effective shear strain energy based on the summing; and generate, based on the extraction, one or more rupture envelope images, wherein the effective shear strain energy of a value of zero corresponds to a transition between slip and no-slip for a fault.

16. The non-transitory computer-readable medium of claim 15, wherein the representation is a three-dimensional representation and wherein the variables comprises a triplet of variables.

17. The non-transistory computer-readable medium of claim 15, wherein the instructions cause the computing system to determine the strain energy of the triangular element by using a Mohr-Coulomb criterion given by the equation $\mu\sigma_n+C_0$, wherein u is the friction coefficient, $\sigma_n$ normal stress on a triangular element, and $C_0$ is the cohesion.

18. The non-transitory computer-readable medium of claim 15, wherein the strain energy is based on difference between a projection of a stress tensor on a crack plane and a Mohr-Coulomb criterion, if the projection of the stress tensor on the crack plane is greater than the Mohr-Coulomb criterion.

19. The non-transitory computer-readable medium of claim 15, wherein a transition between slip and no-slip for a fault is characterized by a transition between the effective shear strain energy between zero and non-zero.

20. The non-transitory computer-readable medium of claim 15, comprising instructions comprise that, when executed by at least one processor of a computing system, cause the computing system to generate one or more visual user interfaces that comprises at least one of the one or more rupture envelope images and a fault representation of at least one of the one or more faults in the region of the earth.

* * * * *